(12) United States Patent
Altman

(10) Patent No.: US 10,126,406 B2
(45) Date of Patent: Nov. 13, 2018

(54) METHOD AND APPARATUS FOR PERFORMING ULTRASONIC PRESENCE DETECTION

(71) Applicant: QUALCOMM Incorporated, San Diego, CA (US)

(72) Inventor: Nathan Altman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 571 days.

(21) Appl. No.: 14/859,093

(22) Filed: Sep. 18, 2015

(65) Prior Publication Data

US 2016/0154089 A1 Jun. 2, 2016

Related U.S. Application Data

(60) Provisional application No. 62/086,679, filed on Dec. 2, 2014.

(51) Int. Cl.
*G01S 5/18* (2006.01)
*G01S 5/02* (2010.01)
(Continued)

(52) U.S. Cl.
CPC .............. *G01S 5/18* (2013.01); *G01S 5/0252* (2013.01); *G01S 7/52004* (2013.01);
(Continued)

(58) Field of Classification Search
CPC ...... G01S 7/52004; G01S 11/08; G01S 15/04; G01S 15/523; G01S 15/878;
(Continued)

(56) References Cited

U.S. PATENT DOCUMENTS 4,991,146 A 2/1991 Ransdell et al.
5,761,155 A 6/1998 Eccardt et al.
(Continued)

FOREIGN PATENT DOCUMENTS

DE 29911390 U1 8/1999
GB 2399969 B 5/2005
JP 2007278805 A 10/2007
WO 2005074320 A2 8/2005

OTHER PUBLICATIONS

Aranha R.G., et al., "Real-Time Relative Positioning with WSN" Sensor Technologies and Applications, 2008, SENSORCOMM '08, Second International Conference on, IEEE, Piscataway, NJ, USA, Aug. 25, 2008 (Aug. 25, 2008), pp. 276-281, XP031319575.
(Continued)

*Primary Examiner* — Daniel Pihulic
(74) *Attorney, Agent, or Firm* — Kilpatrick Townsend & Stockton/Qualcomm

(57) ABSTRACT

Disclosed is an apparatus and method for detecting presence of persons or objects within an environment. The apparatus and method may determine a difference in relative position between transmitters having an unknown room position. A transmitter may emit coded signals that may be detected by other transmitters within the room and properties of the coded signal can form a baseline for comparison to new signals after the baseline is established. Through the use of coded signals and relative distance location between transmitters, movement and position of persons or objects within the room may be determined.

30 Claims, 5 Drawing Sheets

(51) Int. Cl.

| | | |
|---|---|---|
| *G01S 7/52* | (2006.01) | |
| *G01S 11/08* | (2006.01) | |
| *G01S 15/04* | (2006.01) | |
| *G01S 15/52* | (2006.01) | |
| *G01S 15/87* | (2006.01) | |
| *G08B 13/16* | (2006.01) | |
| *G08B 29/26* | (2006.01) | |
| *G01S 15/32* | (2006.01) | |

(52) U.S. Cl.
CPC ............... *G01S 11/08* (2013.01); *G01S 15/04* (2013.01); *G01S 15/523* (2013.01); *G01S 15/878* (2013.01); *G08B 13/1618* (2013.01); *G08B 29/26* (2013.01); *G01S 15/325* (2013.01)

(58) Field of Classification Search
CPC ........ G01S 15/325; G01S 5/18; G01S 5/0252; G08B 13/1618; G08B 29/26
See application file for complete search history.

(56) References Cited

U.S. PATENT DOCUMENTS

| | | |
|---|---|---|
| 6,548,967 B1 | 4/2003 | Dowling et al. |
| 2008/0049555 A1* | 2/2008 | Holm ...................... G01S 7/003 367/99 |
| 2009/0046538 A1 | 2/2009 | Breed et al. |
| 2013/0230180 A1 | 9/2013 | Thormundsson et al. |
| 2016/0154089 A1* | 6/2016 | Altman ............... G01S 7/52004 367/124 |

OTHER PUBLICATIONS

Dijk E., et al., "Estimation of 3D Device Position by Analyzing Ultrasonic Reflection Signals", PRORISC/IEEE Annual Workshop on Circuits and Systems and Signalprocessing, XX, XX, Nov. 26, 2003 (Nov. 26, 2003), pp. 88-94, XP002351808.
International Search Report and Written Opinion—PCT/US2015/058657—ISA/EPO—dated Feb. 3, 2016, 15 pages.

* cited by examiner

METHOD AND APPARATUS FOR PERFORMING ULTRASONIC PRESENCE DETECTION

CROSS-REFERENCE TO RELATED APPLICATIONS

This application claims the benefit of priority from U.S. Provisional Application No. 62/086,679, filed on Dec. 2, 2014, entitled, "METHOD AND APPARATUS FOR PERFORMING ULTRASONIC PRESENCE DETECTION," which is herein incorporated by reference.

FIELD

The subject matter disclosed herein relates generally to ultrasonic detection and positioning of objects within an environment.

BACKGROUND

Traditionally, to interact with an environment, such as a room in a home or office, users rely upon handsets or wired controls to interface devices within the environment. For example, remote controls for televisions, or light switches. In some cases a smart phone may be used to control smart devices in the home, such as light bulbs and multimedia devices. However, reliance on a handheld or accessible control may limit the freedom of users to experience their environment.

Object positioning through range finding with directional transmitters/receivers is known as SONAR (sound navigation and ranging). RADAR (radio detection and ranging) uses an ultrasonic pulse generated in a particular direction to detect objects. If an object is in the path of the pulse, part or all of the pulse will be reflected back to the transmitter as an echo and can be detected through the receiver path. By measuring the difference in time between the pulse being transmitted and the echo being received, it is possible to determine distance to an object.

Another technique used for detection of people within an environment is Infrared (IR). IR may be used to detect body heat, however IR typically requires line of site to the moving body, dedicated components, and needs relatively large surface for the lens of the sensor. Furthermore, IR devices cannot be placed near heat emitting objects like light source.

Another technique utilizes ultrasound Doppler shifts to detect movements due to reflection from the moving object. Doppler systems typically emit a single carrier, and the system measures the deviation from the single carrier. One drawback of this technique is that it requires substantial level of emitted energy, and the level of energy is bound by health regulations. Some products need to exceed allowable health regulation levels to be effective. Doppler shift techniques are also susceptible to no movement scenarios. For example, if a person is static for a period of time, the Doppler based system may determine that the room is vacant. The distance of the moving object from the detector is difficult to estimate since the indication to the position is the energy of the Doppler shift, which is dependent on many parameters apart from distance from emitter. Using pulse-reflection methods is also difficult to implement in standard rooms due to the uncontrolled reflection pattern and required pulse energy. This method also requires two transducers, one of sending and the other for receiving. Therefore, improved detection techniques for detecting and tracking positioning of objects or people within an environment is needed.

SUMMARY

Some embodiments discussed herein provide for detection and tracking of persons or objects within a room. For example, some embodiments discussed herein determine the relative location emitters within a room, and send/receive coded ultrasound signals. Through the relative location determination of the emitters and the coded signals position and movement of objects may be determined.

In one aspect, a method for target detection within a room includes: determining a difference in relative position between a first transmitter and a second transmitter, wherein the first or second transmitter have an unknown room position; emitting, from one or both of the first or second transmitters, a coded signal within the room; detecting the coded signal at one or both of the first or second transmitters; comparing properties of the coded signal to baseline properties for the environment; and determining, according to result of the comparing the properties of the coded signal and the relative position of the first transmitter and the second transmitters, a position of the target within the room.

In another aspect, a device for target detection within a room comprises: memory and a processor coupled to the memory. The processor may be configured to: determine a difference in relative position between a first transmitter and a second transmitter, wherein the first or second transmitter have an unknown room position; emit, from one or both of the first or second transmitters, a coded signal within the room; detect the coded signal at one or both of the first or second transmitters; compare properties of the coded signal to baseline properties for the environment; and determine, according to result of the comparing the properties of the coded signal and the relative position of the first and second transmitters, a position of the target within the room.

In another aspect, machine readable non-transitory storage medium having stored therein program instructions that are executable by a processor to: determine a difference in relative position between a first transmitter and a second transmitter, wherein the first or second transmitter have an unknown room position; emit, from one or both of the first or second transmitters, a coded signal within the room; detect the coded signal at one or both of the first or second transmitters; compare properties of the coded signal to baseline properties for the environment; and determine, according to result of the comparing the properties of the coded signal and the relative position of the first and second transmitters, a position of the target within the room.

In another aspect, an apparatus detects a target within a room, the apparatus comprising: means for determining a difference in relative position between a first transmitter and a second transmitter, wherein the first or second transmitter have an unknown room position; means for emitting, from one or both of the first or second transmitters, a coded signal within the room; means for detecting the coded signal at one or both of the first or second transmitters; means for comparing properties of the coded signal to baseline properties for the environment; and means for determining, from comparing the properties of the coded signal, a position of the target within the room.

Other features and advantages will be apparent from the accompanying drawings and from the detailed description.

DESCRIPTION

Figure 1:
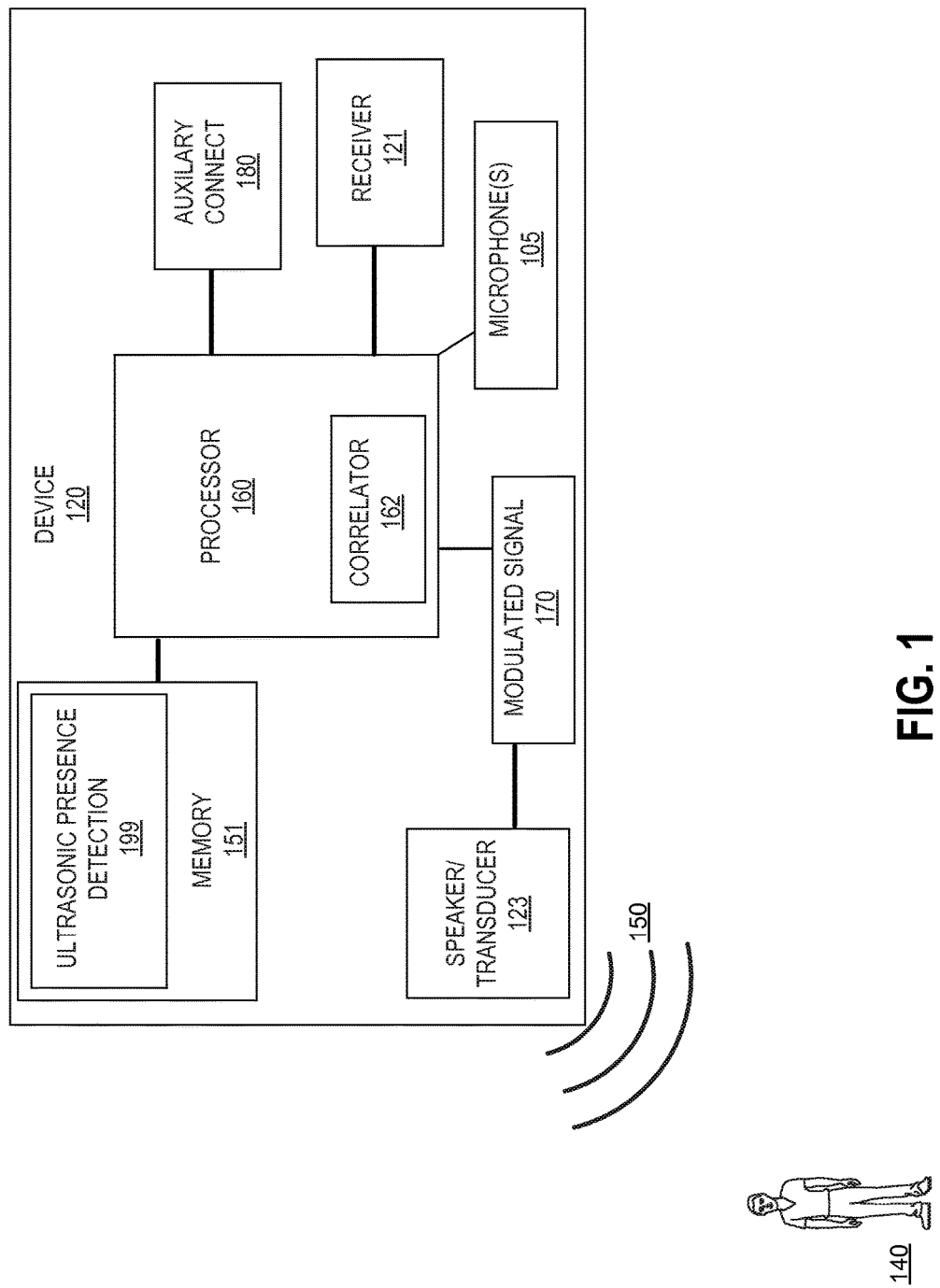
FIG. 1 is block diagram illustrating a device to perform Ultrasonic Presence Detection (UPD), in one embodiment.

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

In one embodiment, Ultrasonic Presence Detection (UPD) initializes one or more UPD devices within an environment by detecting a relative location of the various UPD devices. UPD can utilize ultrasound emission and analysis of reflection patterns to detect and track position of objects (e.g., including persons and things) within an environment. In one embodiment, UPD can identify a person entered or left a room and in response to detecting the presence or movement of a person, UPD can trigger one or more objects, systems, or applications. For example, UPD can determine movement or presence of a person and turn lights or music on or off, have a nearby light or music source follow the person as they traverse the environment, or other interactive features. UPD may also be used to trigger an alarm system or other device. In one embodiment, a device utilizing UPD has an unknown actual location when initialized or installed into an environment and leverages the relative location with respect to one or more other UPD devices to detect and/or track objects within the environment.

In one embodiment, UPD broadcasts a coded signal from an emitter. The coded signal may be continuous or intermittent to reduce power consumption or ultrasound energy present in the air. The signal is reflected from the room objects. Due to the coded nature of the signal, the reflections can be detected even in low Signal to Noise Ratio (SNR) scenarios. The reflection patterns are analyzed in terms of one or more of: delay, amplitude, and Doppler shift per reflection. These reflections can be tracked over time to determine the movement of persons or objects within an environment. Each reflection can be tracked separately, and UPD can keep track of several targets simultaneously. For each reflection, the system can analyze one or more of the reflection time, speed, amplitude. For example, UPD can determine speed either by Doppler shift or by analyzing consecutive reflections. By combining several emitters/receivers, the exact position of the reflector can be detected. UPD object position data allows for automatic interaction of a person with their environment. Just one example application may include directing music to follow or adjust according to current user position within the environment. Other systems may utilize the detection and tracking offered by UPD to determine the user's position and adapt system performance or options accordingly. In other example, UPD may turn on/off or adjust color/intensity of lighting, control volume or picture settings for a television, adjust air conditioning/heat, disable/enable alarms, or manipulate other devices/systems within an environment. As used herein a user may be a person or other detectable object within the environment, for example, the user may in some cases be a household pet. In some embodiments, the user is an object that may traverse the environment, such as a car entering a garage, or other inanimate but movable object to be detected or tracked.

In one embodiment, UPD implements coded signals to enable two or more transmitters to function/operate effectively and simultaneously within the same proximity and environment (e.g., within an enclosed area or room). In one embodiment, the signal may be coded according to a particular frequency, series, time, or other code type. UPD can establish a 'baseline' reflection pattern that can include all or a select subset of objects currently in the environment (e.g., may perform a snapshot reading to determine position of static objects within the environment). UPD may establish its baseline automatically (e.g., at specified intervals or times, such as weekly, monthly or some other time period, or in some embodiments, UPD may detect changes in the environment and trigger a refresh of the baseline), or upon a request (e.g., a user may trigger baseline generation in response to moving furniture or changing an environment). For instance, for a burglar alarm or security system, UPD may probe/trigger the baseline reflection pattern (e.g., automatically or by request, such as specified according to a configuration setting). Changes or deviation from the baseline may be used to determine whether to trigger the alarm system. A sensitivity threshold may be established or configured to determine the amount of change from the baseline that should be classified as a legitimate change for object detection. In an automatic baseline establishment, UPD can learn and re-learn the baseline reflection pattern over time (e.g., when furniture or other objects within an environment has been relocated the new location will be recognized as part of the updated baseline). The analysis of the reflections can use this baseline learning, or it can use differential analysis where only the differences are analyzed, or both baseline and differential analysis. The differential analysis may be easier to implement but may not be as efficient as the baseline learning when detecting or tracking very slow movements. The differential analysis method may function optimally when there is a line of site between emitter and reflector. Non line-of-site objects may have decreased accuracy and amplitude but still will be detectable due to the nature of ultrasound waves.

As introduced above, one implementation of UPD may be as part of a smart light bulb. The light intensity or color from the smart light bulb can be controlled in response to detecting that a person is in the room and according to the determined position of the person (e.g., by sharing the information between two or more UPD enabled devices). In one embodiment, speakers, microphones or other components of an audio/entertainment system are triggered according to presence or movement of a user within the environment. For example, in response to detecting a user (e.g., presence and/or position/direction of a person), UPD can adjust sound characteristics or other parameters of a system (e.g., volume level, equalization or other characteristics may be adjusted on a per speaker basis). A sound system may utilize UPD to direct sound to generate the best sound experience at the particular location of the user, or may determine a balance more appropriate to the position of multiple users in a listening area (e.g., adjusting the sound stage according to the positioning of the audience). UPD may determine signal reflection direction from a system of microphones or transmitters (e.g., two or more UPD enabled devices working in cooperation together), and calculating the timing difference between signal reflections.

In one embodiment, UPD performs a setup and configuration process upon initialization within an unknown/new installation area, or when requested. In comparison to other implementations that may be installed in pre-planned fixed location or placed in location that will allow to pick the best acoustic signal UPD may setup detection and tracking in unknown locations by gathering relative position between UPD enabled devices (e.g., emitters, microphones, transmitters, etc.). For example, UPD may determine the relative position and/or distance between three UPD enabled devices within a room to enable tracking the position of persons/users within the room via triangulation of the signals between the three UPD enabled devices. UPD can determine a position of the moving object from the object's moving signal reflection. This position information further enables generating system policy based on the position. For example, in response to a user entering a designated area (e.g., edge or otherwise determined zone as may assigned in a configuration setting) of the environment, UPD can activate/deactivate or otherwise adjust parameters of one or more systems (e.g., the systems may be internal to the UPD device, or the UPD device may send a request/trigger to an external or communicatively coupled device separate from the UPD device). As one example, if a person/user is passing by an entrance to a room or hall, the detection may not alter a state of the room until the person/user actually enters to room or hall. UPD may also determine the position of static objects within the room enabling better tracking of movements around the objects. In the case of multiple people within the room, UPD can detect and track each individual accurately and separately.

In one embodiment, UPD establishes a mutual position baseline from three or more UPD devices to setup tracking position for a target which may move throughout the environment. For example, UPD may use a process for determining absolute or relative locations of points by measurement of distances, using the geometry of circles, spheres or triangles called "trilateration." When utilizing two UPD enabled devices, UPD can determine position estimation with some ambiguity. For example, with two UPD enabled devices (instead of three or more) UPD, may be unable to accurately resolve "right" or "left" from a virtual line connecting the two devices. With some additional information or constraints, the ambiguity using two devices can be minimized or eliminated. For example, if one of the UPD devices is near a wall, or another object blocking travel and signal reflection, the wall side of the UPD may be eliminated as a possible direction or position of the object. In some embodiments, ambiguity may be resolved using supplemental hardware in the device. For example, with two or more microphones UPD can determine sound and signal reflection direction of arrival to detect objects and overcome a two device positioning ambiguity.

In some embodiments, UPD transmits a modulated continuous signal that reflects the transmitted signal. UPD receivers may be spaced apart from each other receiver/transmitter to detect reflected signals. UPD's modulated continuous signal may include a pre-defined base-band (BB) signal embedded on a carrier signal. UPD may determine Time of Flight (TOF) and/or Line of Sight (LOS) distance based on analysis of base band part and the carrier part of the signal, or using a cross-correlation calculated between an expected modulated signal and a received modulated signal. As used herein, the term cross-correlation means any comparison function that can compare signals, (e.g. minimum variance, minimum absolute error, etc.). Optionally, UPD may transmit the synchronization signal together with the modulated continuous signal to define a start of the TOF delay.

UPD may perform cross-correlation with both the carrier and baseband signal (e.g. without removing and/or performing down conversion), and with or without a low pass filter on the carrier signal. Cross-correlation of the expected and received carrier waveform may facilitate performing phase analysis of the carrier signal.

The Base-Band (BB) signal may provide positioning with accuracy within an order of magnitude corresponding to a wavelength of the carrier signal, while phase analysis of the carrier signal may improve the accuracy by providing information regarding the position within that wavelength. The carrier signal and BB signal may be selected so that the carrier signal falls within the frequency range of the BB signal and/or in the same order of magnitude as the BB signal. The carrier and BB signals may be acoustic and are in the ultrasound (US) frequency range. In other exemplary embodiments, the carrier and base-band signal are electromagnetic and are in the RF range.

Embodiments may resolve ambiguity when determining the LOS distance or reflection distance in the presence of multi-path signals. Ambiguity may be due to overlapping of correlation curves (e.g. correlation curves of the original signal or closest reflection and the multi-path signals), making it difficult to identify the original LOS peak or closest reflection point of the reflecting object.

One or more parameters may be calculated to determine a most likely positioning during exposure to multi-path signals. A scoring system may be used to determine the most likely positioning, based on various defined parameters. Analysis of peaks in an envelope and a real part of the correlation may resolve distance ambiguity. UPD may also use history tracking, velocity tracking, comparison between signals received in each of the receivers, or any combination of the above to resolve distance ambiguity. In some embodiments, a room or environment is measured and the signal results are saved as a baseline measurement set for the room or environment. When a new object/person is detected the baseline measurement of signals may be compared to the newly processed signals.

In one embodiment, compared to hand gesture detection technologies, UPD is capable of longer distance captures (e.g., installed on a ceiling) compared short distance captures used in detecting hand movement in close proximity to a handheld device. Furthermore, the signal length implemented by UPD enabled devices may be longer than close distance detection implementations, in order to cover greater distances. Additionally, UPD enabled devices may record reflection details for an entire human body compared to devices limited to hands, face, or head tracking. In some embodiments, accuracy of entire body tracking may be set with less strict constraints than the constraints utilized in tracking a fingers, hands, eyes, or other small object movement. Additionally, in some embodiments UPD is optimized for reflections traveling and reflecting at a distance farther than arms length since the UPD device transmitter/emitter may be located at a relatively far position (e.g., up high on a ceiling, or away from a doorway). UPD may also leverage multiple UPD enabled devices to establish more than just presence (e.g., movement and position). Additionally, frequency of environment probing may be less than in a hand gesture implementation that monitors quick movement in a relatively smaller area (e.g., close to a mobile device). For example, a person may not be moving quickly through an environment, and may be unlikely to be running through a room.

In one embodiment, the system architecture of UPD is such that the position of the emitters/receivers is not pre-defined or controlled. UPD devices may be placed by a home user without expert installation because the devices avoid complex setup configuration with regard to each device location. Users may plug devices into existing outlets and the UPD device can use relative location to other devices to detect and track objects within the room. In one embodiment, the UPD enabled devices determine their relative position and map the whereabouts of their neighboring emitters. For example, relative position and location may be determined through ultrasound, sharing codes, and timing. Another method is Radio Frequency (RF) wireless communication, such as WiFi. The emitter/receiver can determine their relative distance by synchronizing their internal clocks and emitting signals at pre-determined time (e.g., through the use of Time-of Arrival (ToA) calculation). In some embodiments, received signal strength indication (RSSI) or round-trip time (RTT) may also be measured to determine distance determination to one or more other emitters. Another method UPD may employ is for a receiver device to "ping back" the transmitter with a known time delay between receiving the signal and sending it back. For example, the "ping back" may be implemented with radio frequency (RF), ultrasound, or other technologies. The angular relationship between devices can be calculated by measuring the phase difference of the received signals with multiple microphones on the same emitter/receiver. If a UPD system includes a set of more than two emitter/receivers, their relative position can be determined by sharing the ToA of the ultrasonic signals between set.

FIG. 1 illustrates a device to perform UPD, in one embodiment. A transmitting element (e.g., at a fixed and known location) is provided by speaker 123 which transmits a modulated continuous wave 150. The wave 150 comprises a continuous carrier signal part and a base-band signal modulated onto the carrier. The transmitting element 123 is positioned to transmit the modulated continuous wave over a range in which an object to be positioned may be expected to appear, such as on a ceiling, or integrated into a light bulb or other device and connected through the auxiliary connection 180. A receiving element 121 receives signals transmitted by the transmitting device and reflected by a person or object 140. In some embodiments, device 120 includes one or more microphones 105. In some embodiments, transmitter 123 and receiver 121 may be separate components from device 120.

A position detection element includes processor 160. Device 120 may also include memory 151 to store modules, engines, or programs to perform UPD (e.g., UPD 199). Processor 160 and UPD 199 can use the reflection signal to determine a position of the object, typically by analysis of both the carrier signal part and the base-band signal in the reflected signal.

Device 120 may include a transmitter 123, and receiver 121 for picking up signals transmitted by the transmitter, reflected from an object 140 and received by the receiver(s). In some embodiments, the transmitter and receiver may be one component rather than two separate components as illustrated. Device 120 may estimate the position of the reflecting object within a defined space or environment based on a TOF analysis of the received reflected signals. In some embodiments, device 120 is stationary (e.g., integrated into a light bulb, smoke detector, other device, or as a stand-alone device attached or installed within an environment).

In one embodiment, transmitter 123 transmits a pre-defined modulated continuous signal (e.g., wave 150). One or more receivers (e.g., receiver 121 from device 120) may pick up signals transmitted by transmitter 123. The received signals are compared to an expected signal (e.g., a replica of the pre-defined modulated continuous signal that is pre-stored on the receiver end), or a calculated signal at the receiver end or an acquired signal by the receiver) using a carrier and BB correlator 162. In some embodiments, the carrier and BB correlator is integrated with a processing unit (e.g., processing unit 160). A template, model, and/or features of the pre-defined modulated continuous signal may be pre-stored in non-volatile memory (e.g., memory 151). The template or baseline as used herein is the full model of the expected signal from the mathematical series to the digitized input data. The baseline represents the overall model including for example microphone response, transmitter response, circuitry, reflector, air gaps etc.

The baseline may be used as a starting point for a calculated reference. Baseline examples may vary in terms of the transfer function between the transmitter and the receiver. The receiver may for example accommodate for these differences by adjusting the baseline on the fly or in a special calibration mode. A quantitative measure for the quality of the received signal may be implemented for such a purpose. Such a quantitative measure may be a correlation score, and a pre-defined threshold on the correlation score may be implemented to define the quality of the signal. For example, when the correlation score is above the pre-defined threshold, the received signal may be used by the system to adjust the baseline.

Receiver 121 receive one or more signals from transmitter 123 which may be integrated in device 120 as illustrated in FIG. 1, or in some embodiments, may be a separate device. The receiver 121 and transmitter 123 may be stationary, spaced apart, and positioned at pre-defined locations. In one exemplary embodiment, receiver 121 is positioned within a light bulb or installed in a room or environment (e.g., in a living room or other area where people may enter, leave, or otherwise interact with the room). Receiver 121 may be a microphone. A carrier and BB correlator 152 in electrical or logical communication with receiver 121 may include circuitry to cross-correlate the received and expected modulated signal without extracting the BB signal from its carrier and/or to carry out cross correlation of the BB signal together with the carrier signal. Typically a template of the expected modulated signal may be implemented for cross-correlation with the received signal.

Synchronization of transmitters and receivers may be achieved in the present embodiment by using the same clock source for transmitters and receivers. TOF measurement includes measuring the time between the emission of the modulated signal 150 and the estimation of the most likely delay of the received signal. In some embodiments, device 120 also utilizes the Doppler effect/shift associated with signals in a room to determine movement of objects or people.

Processor 160 may determine positioning based on cross-correlation results of the carrier and base-band signal as well as Doppler shift. Each system may be associated with a dedicated carrier and BB correlator 152, and the transmitter 123 may emit one of a series of possible signals. In this manner, several transmitters may transmit simultaneously from the same system, without interfering. Several systems may be used in the same vicinity, each using a different set of signals to avoid interference with other near-by systems. Optionally, before transmission, a system listens to the surrounding environment, choosing a signal dynamically in order to avoid interference.

In alternate embodiments, carrier and BB correlator and/or its functionality is integral to a processing unit 160, e.g. in a personal computer or computing device associated with the positioning system. Processor 160 may include Fast Fourier Transform (FFT) capability and may be used to perform phase and amplitude analysis of the received signals.

Memory unit 151 may include memory capability, e.g. memory capability to store information from received signals, parameters of an expected modulated continuous signal and/or other information. Memory unit 151 may include volatile as well as non-volatile memory. Memory unit 151 may store one or more calibration parameters implemented to adjust the template based on features, e.g. transfer functions of the specific hardware sets, e.g. receivers and transmitters. Exemplary calibration parameters may include differences in phase, amplitude, and group delay of the template among other parameters.

The modulated continuous signal source 170 may be an acoustic signal source, e.g. in the ultrasound range. For example, the signal range of the modulated continuous signal source 170 may vary between around 20 and 80 KHz and/or up to 200 KHz. Although frequencies above 200 KHz may also be used for acoustic signals, the inventors have found that as the frequencies of acoustic signals are increased, so is susceptibility to loss of LOS. An increase in frequency may have an impact on overall acoustic response due to small artifacts with dimensions bigger or in the vicinity of the wavelength or on the decay rate of the transmitting signal, resulting in a smaller effective range of the system.

According to other embodiments, signal source 112 may be an RF signal source. In some exemplary embodiments, the RF signal source may emit signals in the Ultra High Frequency (UHF) range, e.g. 433 MHz, 868 MHz, 900 MHz, 915 MHz, and 2.4 GHz and/or in the Ultra-Wideband (UWB) range, e.g. 3.1-10.6 GHz. The distance between the transmitting/receiving system and the reflecting object may be determined based on the TOF of the modulated continuous signal from the transmitter, reflecting from an object and picked up by the receivers. The received signal may include typically the shortest path, generally the LOS, or the shortest distance between the transmitters and receivers, a group of reflections from the reflecting object or person, and reflections from the device itself and the environment. One receiver may be able to determine a distance to the reflecting object. Two receivers may allow determination of a sub-space of possible reflector positions. Position of the reflecting object in three dimensions may be determined based on triangulation of the distances determined from each of the three receivers.

Based on the received signal, processor 160 calculates the TOF based on the carrier and BB signal and typically performs triangulation to determine the position of the transmitting device as a function of time.

The system and method described herein may be easily adapted to RF systems and also to multiple devices or users (e.g. groups of users working in proximity to each other). For example, each transmitting device 110 may transmit a unique modulated continuous signal that may be recognized by dedicated detectors. The carrier signal in different transmitting devices may be modulated by a different base-band signal for different users. Each receiver and/or detector may recognize the base-band pattern corresponding to its related transmitter. For example, recognition may be enabled by signal analysis of the base-band signal.

Specifically, the usage of orthogonal BB series, or nearly orthogonal BB series, may be implemented. The term "nearly orthogonal" means that the cross-correlation of two different BB series may have low values in reference to each series auto-correlation.

Received signals that do not possess defined properties of the expected base-band signal may be ignored and/or excluded from TOF analysis. Since TOF is determined by both the base-band and carrier information, different signals may be implemented without sacrificing the accuracy of the detection and/or estimation of the TOF.

Figure 2:
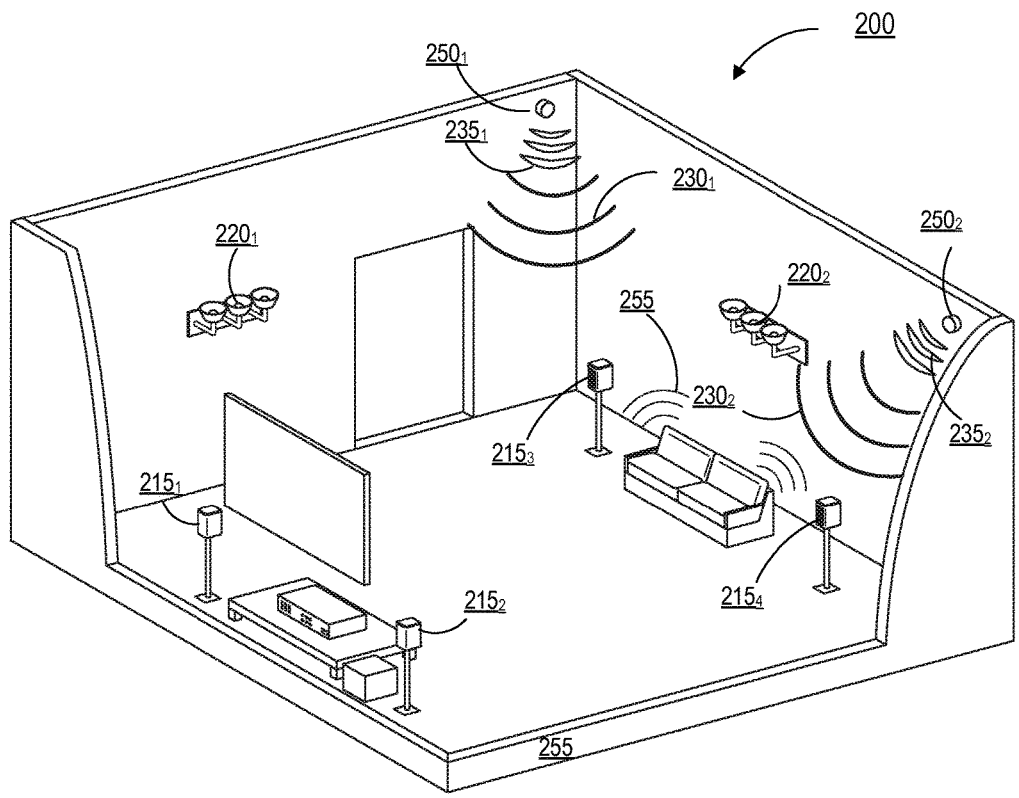
FIG. 2 is block diagram illustrating an operating environment for UPD, in another embodiment.
Figure 2:
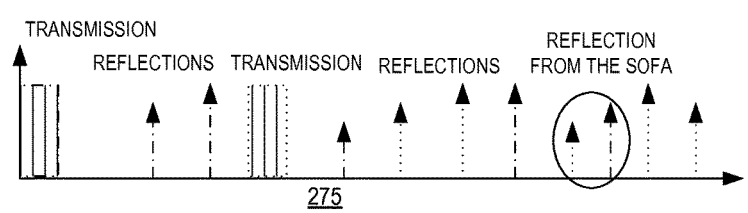

FIG. 2 is block diagram illustrating an operating environment for UPD, in one embodiment. Environment 200 may be a room or other area visited by people or objects to track by UPD. For example, UPD may be implemented through a specialized device (e.g., devices $250_1$ and $250_2$) coupled to a wall, ceiling, or other structure within the environment. Alternatively, UPD may be integrated into speakers (e.g., speakers $215_{1-4}$), lights (e.g., lights $220_{1-2}$), televisions, entertainment systems, multifunction devices, or other systems within the environment.

Coded signals may be reflected from static and moving objects within the environment (e.g., environment 200). Each object within an environment may have unique reflection signatures representing the space the object occupies within the room. For example, each solid object occupying a position within the room may reflect sound in a specific identifiable manner. For example, a couch in environment 200 may have unique reflections, and these unique reflections may be constant and unchanging such that they may be recognized at any point in time when compared to an initial baseline measurement. In contrast, person 140 may move throughout the environment and have no directly comparable baseline identification for device 120 to match.

Figure 3:
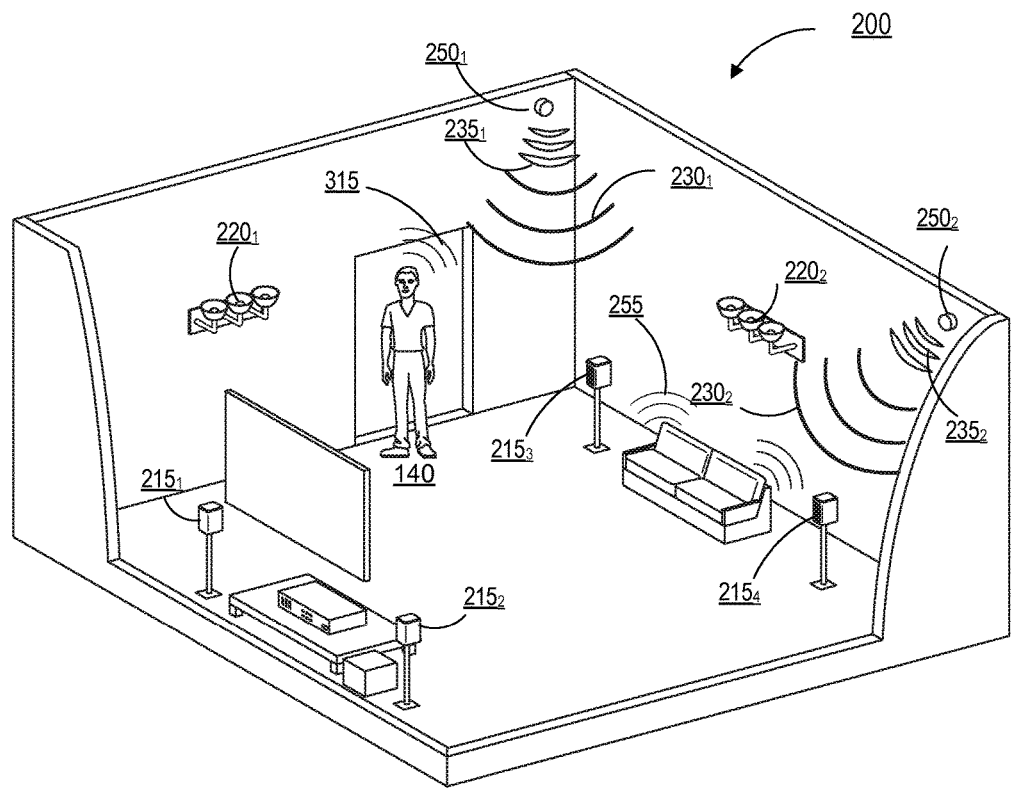
FIG. 3 is block diagram illustrating an operating environment for UPD, in yet another embodiment.
Figure 3:
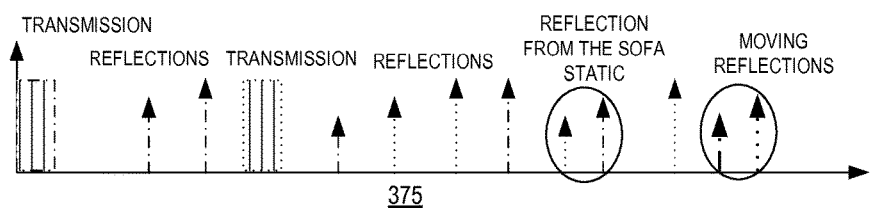

FIG. 3 is block diagram illustrating an operating environment for UPD, in another embodiment. FIG. 3 illustrates the arrival of the person 140 into the environment 200. Reflected signal 315 from person 140 may trigger one or more features of UPD as described herein. When person 140 is detected in the environment (e.g., moving reflections may be detected as a new arrival to an environment compared to a baseline), UPD can trigger one of a plurality of actions to a device or service. For example, turning on a light bulb, directing music to a specific speaker or other devices or services. As illustrated in FIGS. 2 and 3, two different transmissions have different and unique reflections (e.g., coded ultrasound reflections) which may be identified as coming from the particular transmission. For example, one (illustrated with dotted line) may originate from transmitter $250_1$ and another (illustrated with dots and slashes) may originate from $250_2$. As illustrated in the graphs of FIGS. 2 and 3, the static reflection of the room at the far right of the graph is replaced by two separate moving reflections originating from the two transmitters.

Figure 4:
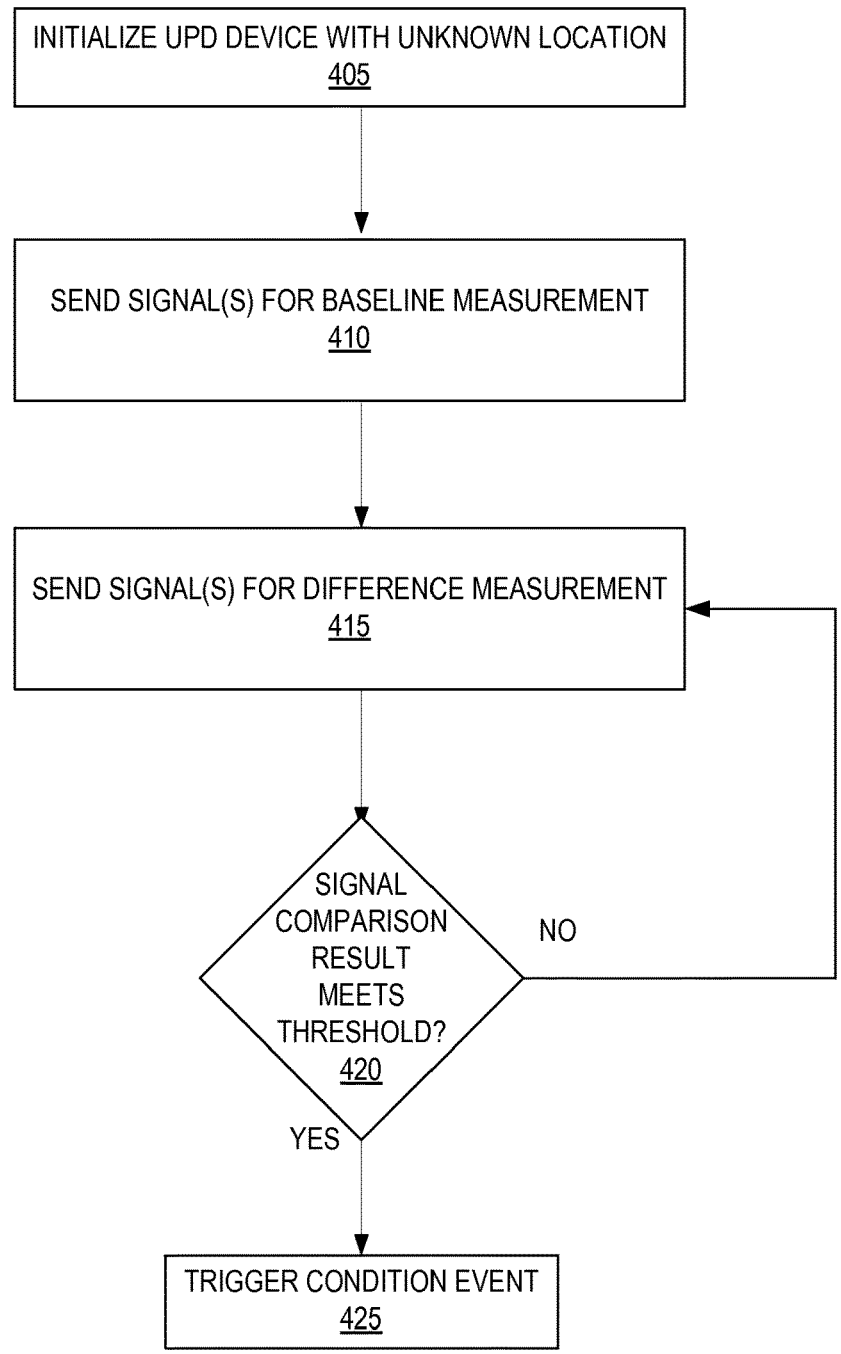
FIG. 4 is flow diagram illustrating a method for performing UPD, in one embodiment.

FIG. 4 is flow diagram illustrating a method for performing UPD, in one embodiment. At block 405, the embodiment (e.g., UPD) initializes a UPD device with unknown location. In some embodiments, a UPD device may be unboxed by a user at their home and installed without configuring a location of the UPD device. For example, the UPD device may be a light bulb that is screwed into existing home ceiling sockets. The UPD device may initialize itself by pinging for nearby UPD devices and determining relative distance between the device and other devices. In response to determining relative location compared to other UPD devices the self-configuration may be considered complete and ready to proceed with establishing a baseline measurement for the room at block 410.

At block 410, the embodiment sends signal(s) for baseline measurement. For example, emitters of a UPD device may send out signals to measure reflections within the environment. The initial measurement may be considered as a baseline, however the user may force a new baseline in response to changes in the environment (e.g., moving of furniture). In some embodiments, UPD may detect changes in static objects within the environment and establish a new baseline automatically.

At block 415, the embodiment sends signal(s) for difference measurement. For example, emitters of a UPD device may send out signals to measure reflections within the environment.

At block 420, the embodiment determines whether the signal comparison result meets a threshold. If the threshold is met, a trigger condition event may be triggered at block 425, otherwise the UPD device will continue to send signal(s) to determine a difference measurement and detect objects at block 415. For example, condition events may include turning on a light bulb when a person is detected within a room, or turning off a light bulb when a person leaves the room. Another condition event may be adjusting the sound level or parameters of sound according to the position of a person within a room. Yet another condition event may be to trigger an alarm system in response to detecting a person within the room. The condition event may trigger an integrated feature of the UPD device (e.g., light of the light bulb), or the condition event may trigger an external event (e.g., alarm siren of an alarm system separate from the UPD device detecting the presence of the intruder).

Figure 5:
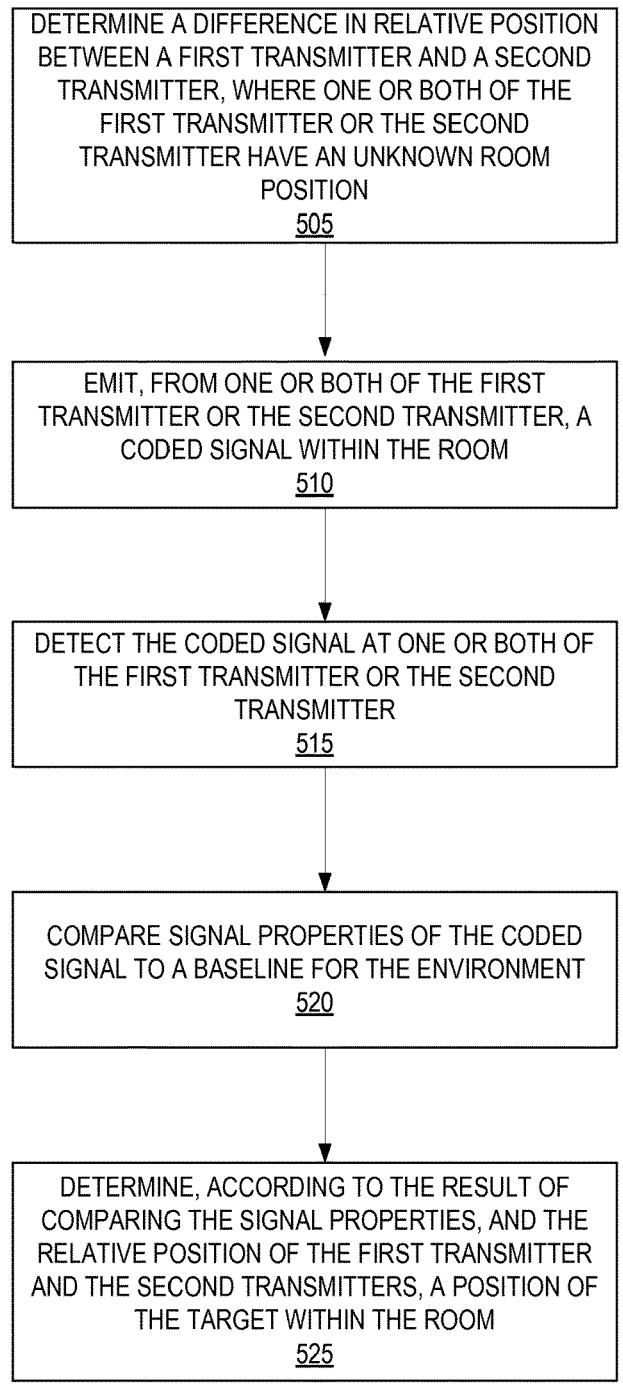
FIG. 5 is flow diagram illustrating a method for performing UPD, in another embodiment.

FIG. 5 is flow diagram illustrating a method for performing UPD, in another embodiment. At block 505, the embodiment (e.g., UPD) determines a difference in relative position between a first transmitter and a second transmitter, where one or both of the first transmitter or the second transmitter have an unknown room position. For example, the first and second transmitters (e.g., each transmitters implemented within device 120) may exchange signal pings or one may send and one may receive a signal ping. The distance between the transmitters may be saved to a UPD system or locally to each transmitter for further processing during determining baseline measurements and object detection. In some embodiments, determining the relative difference includes performing measurements between the first transmitter and the second transmitter, where the first transmitter and the second transmitters are communicatively coupled, and wherein the measurements are one or more types of: ultrasound, radio frequency, or any combination thereof. Measuring ultrasound between two or more transmitters may include measurements from synchronizing an internal clock between the two or more transmitters and measuring timing of a received ultrasound according to the internal clock.

At block 510, the embodiment emits, from one or both of the first transmitter or the second transmitter, a coded signal within the room. For example, the signal may be used to identify a particular emitter such that when reflected signals are received they can be associated with the emitter. In some embodiments the emitter and receiver is integrated into a smart light bulb, fixture within a room, or other device (e.g., device 120). The coded signal may be continuous or intermittent.

At block 515, the embodiment detects the coded signal at one or both of the first transmitter or the second transmitter. For example, the coded signal may be received by a microphone (e.g., microphone 105) and the coded signal is associated with a particular emitter which may or may not be the same device (i.e., device 120) receiving the coded signal. For example, light bulb "A" may send a coded signal and the coded signal from "A" may be received by a different light bulb "B" which will decode and recognize the signal originating from light bulb "A."

At block 520, the embodiment compares signal properties of the coded signal to a baseline for the environment. For example, a baseline for comparison may be an empty room, or a room with static objects such as furniture.

At block 525, the embodiment, determines, according to a result of comparing the signal properties, and the relative position of the first transmitter and the second transmitters, a position of the target within the room. For example, in response to comparing the baseline (e.g., a static room) to the current measurements UPD is able to detect and track a new object within the room. In other embodiments with multiple transmitters and receivers the positioning of the person and movement of the person may be determined. The signal properties may include one or more of: delay, amplitude, Doppler shift, or any combination thereof. In some embodiments, in response to determining the object's position within the room, a device or feature of a device is triggered (e.g., a light, sound, alarm, or other features of the UPD device or an external device).

In some embodiments, in response to determining the arrival or position of a person one or more triggers to features or separate devices may be performed. For example, in response to a person entering a room, music from a multimedia player may begin, or the music volume may be adjusted. As a person moves into a different room or section of the room, one or more speakers may be adjusted to provide varying levels of sound from the multimedia device. For example, as illustrated in FIG. 2, speaker $215_3$ may be turned on when the person enters the room while $215_4$ remains off until the person moves further into the room. In one embodiment UPD may focus the sound (e.g., music or television) to the location of the person.

UPD as described herein may be implemented as software, firmware, hardware, module, or engine. In one embodiment, the previous UPD description may be implemented by one or more general purpose processors (e.g., processor 160 of device 120) and in memory (e.g., device memory 151) to achieve the previously desired functions (e.g., the methods of FIGS. 4 and 5).

The teachings herein (e.g., features of UPD) may be incorporated into (e.g., implemented within or performed by) a variety of apparatuses (e.g., devices). For example, one or more aspects taught herein may be incorporated into a smart light bulb, phone (e.g., a cellular phone), a personal data assistant, a tablet, a mobile computer, a laptop computer, a tablet, an entertainment device (e.g., a music or video device), wearable device (e.g., watch, headphones, an earpiece, etc.), a user I/O device, a computer, a server, an entertainment device, a set-top box, or any other suitable device.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of embodiments described herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device (e.g., a server or device). It will be recognized that various actions described herein can be performed by specific circuits (e.g., application specific integrated circuits), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Erasable Programmable Read-only Memory (EPROM), Electronically Erasable Programmable Read-only Memory (EEPROM), registers, hard disk, a removable disk, a Compact Disc Read Only Memory (CD-ROM), or any other form of storage medium known in the art. An exemplary storage medium is coupled to the processor such the processor can read information from, and write information to, the storage medium. In the alternative, the storage medium may be integral to the processor. The processor and the storage medium may reside in an Application-Specific Integrated Circuit (ASIC). The ASIC may reside in a user terminal. In the alternative, the processor and the storage medium may reside as discrete components in a user terminal.

In one or more exemplary embodiments, the functions or modules described may be implemented in hardware, software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the embodiments described herein. Various modifications to these embodiments will be readily apparent to those skilled in the art, and the generic principles defined herein may be applied to other embodiments without departing from the spirit or scope of the present disclosure. Thus, the embodiments shown herein are not intended to be limited to the present description but is to be accorded the widest scope consistent with the principles and novel features disclosed herein.

What is claimed is:

1. A method for target detection within a room, the method comprising:
   determining a difference in relative position between a first transmitter and a second transmitter, wherein one or both of the first transmitter or the second transmitter have an unknown position within the room;
   emitting, from one or both of the first transmitter or the second transmitter, a coded signal within the room;
   detecting the coded signal, as reflected by a target, at one or both of the first transmitter or the second transmitter;
   comparing signal properties of the detected coded signal to a baseline for the room; and
   determining, according to a result of comparing the signal properties, and the determined difference in relative position, a position of the target within the room,
   wherein the position of the target within the room is independent of a position of the first transmitter within the room, and the position of the target within the room is independent of a position of the second transmitter within the room.

2. The method of claim 1, wherein determining the difference in relative position comprises:
   measuring one or both of ultrasound or radio frequencies between the first transmitter and the second transmitter, wherein the first transmitter and the second transmitters are communicatively coupled.

3. The method of claim 2, wherein the measuring comprises:
   synchronizing an internal clock between the first transmitter or the second transmitter, and
   measuring timing of a received ultrasound according to the internal clock.

4. The method of claim 1, wherein the coded signal comprises a continuous carrier signal.

5. The method of claim 1, wherein the signal properties comprise delay, amplitude, Doppler shift, or any combination thereof.

6. The method of claim 1, wherein the emitting and the detecting are performed by the first transmitter.

7. The method of claim 1, wherein in response to determining the target's position within the room, one or both of a device or a feature of a device is triggered, and
   wherein the device is a light bulb, an alarm system, an entertainment system, or any combination thereof.

8. A device for target detection within a room, the device comprising:
   memory; and
   a processor coupled to the memory and configured to:
   determine a difference in relative position between a first transmitter and a second transmitter, wherein the first or second transmitter have an unknown position within the room;
   emit, from one or both of the first transmitter or the second transmitter, a coded signal within the room;
   detect the coded signal, as reflected by a target, at one or both of the first transmitter or the second transmitter;
   compare signal properties of the detected coded signal to a baseline for the room; and
   determine, according to a result of comparing the signal properties, and the determined difference in relative position, a position of the target within the room,
   wherein the position of the target within the room is independent of a position of the first transmitter within the room, and the position of the target within the room is independent of a position of the second transmitter within the room.

9. The device of claim 8, wherein the processor is configured to determine the difference in relative position by executing instructions to:
   measure one or both of ultrasound or radio frequencies between the first transmitter and the second transmitter, wherein the first transmitter and the second transmitters are communicatively coupled.

10. The device of claim 9, wherein the instructions to measure comprise instructions to:
    synchronize an internal clock between the first transmitter or the second transmitter, and
    measure timing of a received ultrasound according to the internal clock.

11. The device of claim 8, wherein the coded signal comprises a continuous carrier signal.

12. The device of claim 8, wherein the signal properties comprise delay, amplitude, Doppler shift, or any combination thereof.

13. The device of claim 8, wherein the emitting and the detecting are performed by the first transmitter.

14. The device of claim 8, wherein in response to determining the target's position within the room one or both of an other device or a feature of the other device is triggered.

15. The device of claim 14, wherein the other device is light bulb, alarm system, entertainment system, or any combination thereof.

16. A machine readable non-transitory storage medium having stored therein program instructions that are executable by a processor to:
    determine a difference in relative position between a first transmitter and a second transmitter, wherein the first or second transmitter have an unknown position within a room;
    emit, from one or both of the first transmitter or the second transmitter, a coded signal within the room;
    detect the coded signal, as reflected by a target, at one or both of the first transmitter or the second transmitter;
    compare signal properties of the detected coded signal to a baseline for the room; and
    determine, according to a result of comparing the signal properties, and the determined difference in relative position, a position of the target within the room,
    wherein the position of the target within the room is independent of a position of the first transmitter within the room, and the position of the target within the room is independent of a position of the second transmitter within the room.

17. The medium of claim 16, wherein the instructions to determine the difference in relative position comprise instructions to:
    measure one or both of ultrasound or radio frequencies between the first transmitter and the second transmitter, wherein the first transmitter and the second transmitters are communicatively coupled.

18. The medium of claim 17, wherein the instructions to measure comprise instructions to:
    synchronize an internal clock between the first transmitter and the second transmitter, and
    measure timing of a received ultrasound according to the internal clock.

19. The medium of claim 16, wherein the coded signal comprises a continuous carrier signal.

20. The medium of claim 16, wherein the signal properties comprise delay, amplitude, Doppler shift, or any combination thereof.

21. The medium of claim 16, wherein the emitting and the detecting are performed by the first transmitter.

22. The medium of claim 16, wherein in response to determining the target's position within the room, one or both of a device or a feature of a device is triggered, and
wherein the device is a light bulb, an alarm system, an entertainment system, or any combination thereof.

23. An apparatus for target detection within a room, the apparatus comprising:
means for determining a difference in relative position between a first transmitter and a second transmitter, wherein the first or second transmitter have an unknown room position;
means for emitting, from one or both of the first transmitter or the second transmitter, a coded signal within the room;
means for detecting the coded signal, as reflected by a target, at one or both of the first transmitter or the second transmitter;
means for comparing signal properties of the detected coded signal to a baseline for the room; and
means for determining, according to a result of comparing the signal properties, and the determined difference in relative position, a position of the target within the room,
wherein the position of the target within the room is independent of a position of the first transmitter within the room, and the position of the target within the room is independent of a position of the second transmitter within the room.

24. The apparatus of claim 23, wherein the means for determining the difference in relative position comprises:
means for measuring one or both of ultrasound or radio frequencies between the first transmitter and the second transmitter, wherein the first transmitter and the second transmitters are communicatively coupled.

25. The apparatus of claim 24, wherein the means for measuring comprises:
means for synchronizing an internal clock between the first transmitter and the second transmitter, and
means for measuring timing of a received ultrasound according to the internal clock.

26. The apparatus of claim 23, wherein the coded signal comprises a continuous carrier signal.

27. The apparatus of claim 23, wherein the signal properties comprise delay, amplitude, Doppler shift, or any combination thereof.

28. The apparatus of claim 23, wherein in response to determining the target's position within the room, one or both of a device or a feature of a device is triggered.

29. The method of claim 1, wherein the baseline comprises signal properties measured when the target is not within the room.

30. The method of claim 6, wherein the detecting comprises detecting the coded signal, as reflected by the target, at the second transmitter.

* * * * *

UNITED STATES PATENT AND TRADEMARK OFFICE
CERTIFICATE OF CORRECTION

PATENT NO.         : 10,126,406 B2
APPLICATION NO.    : 14/859093
DATED              : November 13, 2018
INVENTOR(S)        : Nathan Altman Page 1 of 1

It is certified that error appears in the above-identified patent and that said Letters Patent is hereby corrected as shown below:

In the Claims

Column 16, Line 22, of Claim 14, change "room" to -- room, --.

Signed and Sealed this
Twenty-second Day of January, 2019

Andrei Iancu
*Director of the United States Patent and Trademark Office*